(12) United States Patent
Onggosanusi et al.

(10) Patent No.: US 11,510,080 B2
(45) Date of Patent: Nov. 22, 2022

(54) METHOD AND APPARATUS FOR TRIGGERING MULTI-BEAM REPORTING

(71) Applicant: Samsung Electronics Co., Ltd., Suwon-si (KR)

(72) Inventors: Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,912

(22) Filed: May 28, 2020

(65) Prior Publication Data

US 2021/0022026 A1    Jan. 21, 2021

Related U.S. Application Data

(60) Provisional application No. 63/019,665, filed on May 4, 2020, provisional application No. 62/875,766, filed on Jul. 18, 2019, provisional application No. 62/875,203, filed on Jul. 17, 2019.

(51) Int. Cl.
| | |
|---|---|
| *H04W 24/10* | (2009.01) |
| *H04B 7/06* | (2006.01) |
| *H04B 17/318* | (2015.01) |
| *H04B 17/336* | (2015.01) |
| *H04L 5/00* | (2006.01) |
| *H04W 72/14* | (2009.01) |

(52) U.S. Cl.
CPC .......... *H04W 24/10* (2013.01); *H04B 7/0617* (2013.01); *H04B 7/0626* (2013.01); *H04B 7/0695* (2013.01); *H04B 17/318* (2015.01); *H04B 17/336* (2015.01); *H04L 5/0051* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2017/0230849 A1* | 8/2017 | Wei | ........................ H04L 5/0048 |
| 2018/0255607 A1 | 9/2018 | Nagaraja et al. | |
| 2018/0352492 A1* | 12/2018 | Dang | ................. H04W 36/0061 |

(Continued)

FOREIGN PATENT DOCUMENTS

| | | |
|---|---|---|
| EP | 3547564 A1 | 10/2019 |
| KR | 10-2019-0054978 A | 5/2019 |

(Continued)

OTHER PUBLICATIONS

"LTE; Evolved Universal Terrestrial Radio Access (E-UTRA); Physical channels and modulation (3GPP TS 36.211 version 12.4.0 Release 12)", Feb. 2015, 126 pages.

(Continued)

*Primary Examiner* — Scott M Sciacca

(57) ABSTRACT

Methods and apparatuses for beam reporting. A method for operating a user equipment (UE) includes receiving, from a base station, configuration information on a beam reporting and a set of uplink (UL) reporting resources; receiving at least one reference signal (RS) resource; measuring the at least one RS resource for calculating the beam reporting; and transmitting the beam reporting on at least one UL reporting resource from the set of UL reporting resources after an event occurs.

18 Claims, 13 Drawing Sheets

(56) References Cited

U.S. PATENT DOCUMENTS

| | | | | |
|---|---|---|---|---|
| 2019/0173534 A1* | 6/2019 | Kakishima | ............ | H04W 52/24 |
| 2019/0222283 A1* | 7/2019 | Yum | ...................... | H04L 5/0094 |
| 2019/0334686 A1* | 10/2019 | Li | ......................... | H04W 76/27 |
| 2020/0028652 A1* | 1/2020 | Bai | ....................... | H04L 5/0053 |

FOREIGN PATENT DOCUMENTS

| | | | |
|---|---|---|---|
| WO | 2019050316 | A1 | 3/2019 |
| WO | 2019136205 | A1 | 7/2019 |
| WO | 2019182415 | A1 | 9/2019 |
| WO | 2020018258 | A1 | 1/2020 |

OTHER PUBLICATIONS

"LTE; Evolved Universal Terrestrial Radio Access (E-UTRA); Multiplexing and channel coding (3GPP TS 36.212 version 12.3.0 Release 12)", Feb. 2015, 91 pages.

"LTE; Evolved Universal Terrestrial Radio Access (E-UTRA); Physical layer procedures (3GPP TS 36.213 version 12.4.0 Release 12)", Feb. 2015, 227 pages.

"LTE; Evolved Universal Terrestrial Radio Access (E-UTRA); Medium Access Control (MAC) protocol specification (3GPP TS 36.321 version 12.4.0 Release 12)", Feb. 2015, 62 pages.

"LTE; Evolved Universal Terrestrial Radio Access (E-UTRA); Radio Resource Control (RRC); Protocol specification (3GPP TS 36.331 version 12.4.1 Release 12)", Feb. 2015, 415 pages.

"3rd Generation Partnership Project; Technical Specification Group Radio Access Network; NR; Physical channels and modulation (Release 15)", 3GPP TS 38.211 V15.0.0, Dec. 2017, 73 pages.

"3rd Generation Partnership Project; Technical Specification Group Radio Access Network; NR; Multiplexing and channel coding (Release 15)", 3GPP TS 38.212 V15.0.0, Dec. 2017, 82 pages.

"3rd Generation Partnership Project; Technical Specification Group Radio Access Network; NR; Physical layer procedures (Release 15)", 3GPP TS 38.213 V15.0.0, Dec. 2017, 56 pages.

"3rd Generation Partnership Project; Technical Specification Group Radio Access Network; NR; Physical layer procedures for data (Release 15)", 3GPP TS 38.214 V15.0.0, Dec. 2017, 71 pages.

"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.

"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.

"3rd Generation Partnership Project; Technical Specification Group Radio Access Network; NR; Physical layer measurements (Release 15)", 3GPP TS 38.215, V15.0.0, Dec. 2017, 13 pages.

Xiaomi, "Enhancements on beam management," R1-1813340, 3GPP TSG RAN WG1 Meeting #95, Spokane, USA, Nov. 12-16, 2018, 4 pages.

International Search Report and Written Opinion of the International Searching Authority in connection with International Application No. PCT/KR2020/009335 dated Oct. 26, 2020, 9 pages.

Extended European Search Report dated Jul. 5, 2022 regarding Application No. 20841177.7, 14 pages.

Xiaomi, "Enhancements on beam management", 3GPP TSG RAN WG1 Meeting #95, R1-1813340, Nov. 2018, 4 pages.

Nokia et al., "On beam grouping and reporting", 3GPP TSG-RAN WG1 Meeting #89, R1-1708907, May 2017, 12 pages.

\* cited by examiner

METHOD AND APPARATUS FOR TRIGGERING MULTI-BEAM REPORTING

CROSS-REFERENCE TO RELATED APPLICATIONS AND CLAIM OF PRIORITY

This application claims priority to U.S. Provisional Patent Application No. 62/875,203 filed Jul. 17, 2019; U.S. Provisional Patent Application No. 62/888,208 filed Aug. 16, 2019; and U.S. Provisional Patent Application No. 63/019,665 filed May 4, 2020. The above-identified provisional patent applications are hereby incorporated by reference in their entirety.

TECHNICAL FIELD

The present disclosure relates generally to methods for wireless communication systems and, more specifically, reporting for multi-beam system.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment (UE) can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for beam reporting.

In one embodiment, a UE is provided. The UE includes a transceiver and a processor operably connected to the transceiver. The transceiver is configured to receive, from a base station (BS), configuration information on a beam reporting; receive configuration information on a set of uplink (UL) reporting resources; and receive at least one reference signal (RS) resource. The processor is configured to measure the at least one RS resource for calculating the beam reporting. The transceiver is further configured to transmit the beam reporting on at least one UL reporting resource from the set of UL reporting resources after an event occurs.

In another embodiment, a BS is provided. The BS includes a processor and a transceiver operably connected to the processor. The processor is configured to generate configuration information on a beam reporting and a set of UL reporting resources. The transceiver is configured to transmit, to a UE, the configuration information for the beam reporting and the set of UL reporting resources; transmit, to the UE, at least one RS resource; and receive, from the UE, the beam reporting on at least one UL reporting resource from the set of UL reporting resources after an event occurs.

In yet another embodiment, a method for operating a UE is provided. The method includes receiving from a base station, configuration information on a beam reporting and a set of UL reporting resources; receiving at least one RS resource; measuring the at least one RS resource for calculating the beam reporting; and transmitting the beam reporting on at least one UL reporting resource from the set of UL reporting resources after an event occurs.

The present disclosure relates to a pre-5th-Generation (5G) or 5G communication system to be provided for supporting higher data rates Beyond 4th-Generation (4G) communication system such as Long-Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
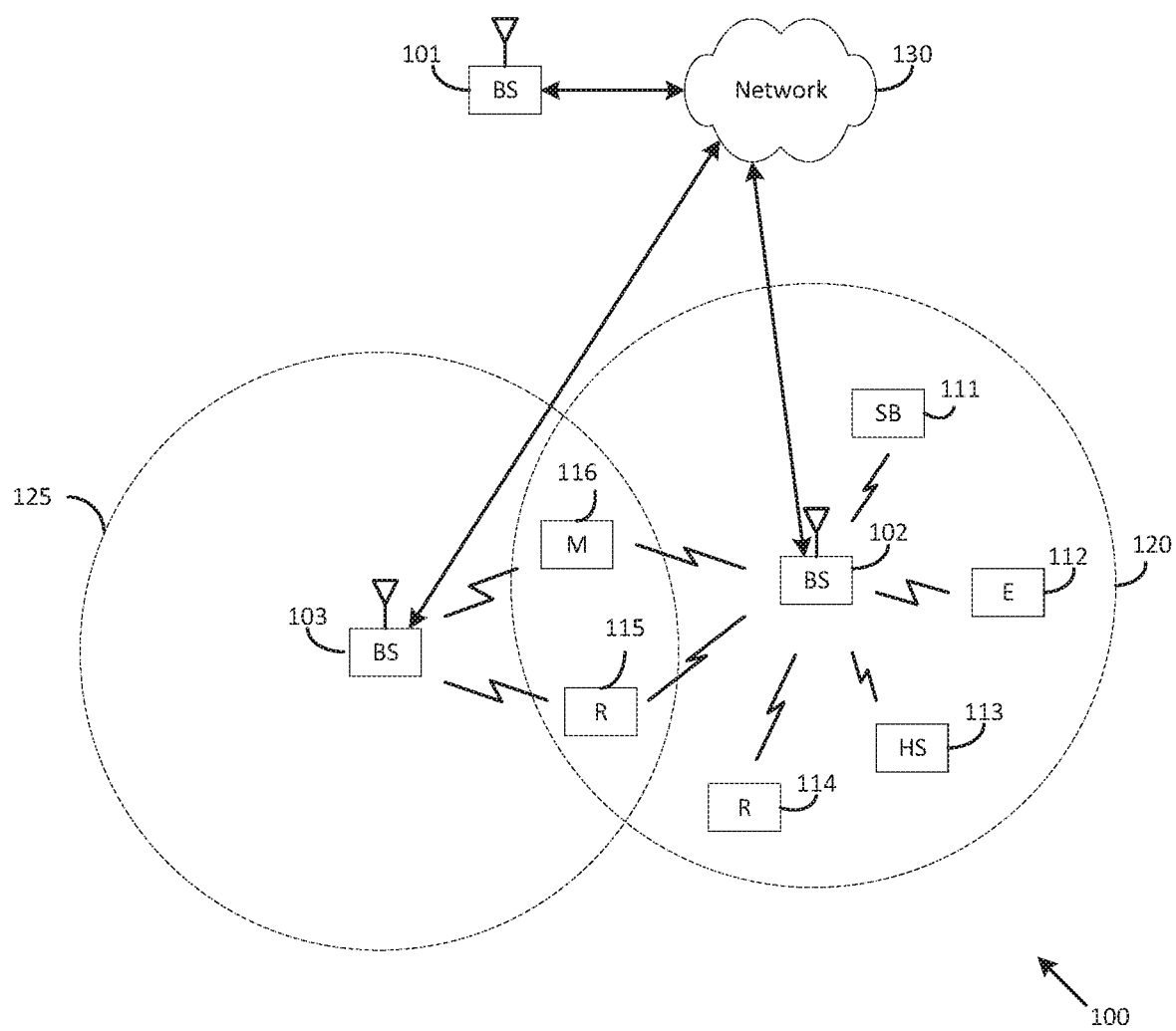
FIG. 1 illustrates an example wireless network according to various embodiments of the present disclosure.

FIGS. 1 through 14, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

List of Acronyms

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); 3GPP TS 38.331 version 15.0.0, "NR, Radio Resource Control (RRC) Protocol Specification" ("REF 11"); and 3GPP TS 38.215 version 15.0.0, "NR, Physical Layer Measurements" ("REF 12")".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands or, in general, above 6 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmits beam reporting information to UEs 111-116 and configure UEs 111-116 for beam reporting as described in embodiments of the present disclosure. In various embodiments, one or more of UEs 111-116 receive beam reporting information as described in embodiments of the present disclosure.

Although FIG. 1 illustrates one example of a wireless network 100, various changes can be made to FIG. 1. For example, the wireless network 100 can include any number of gNB s and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
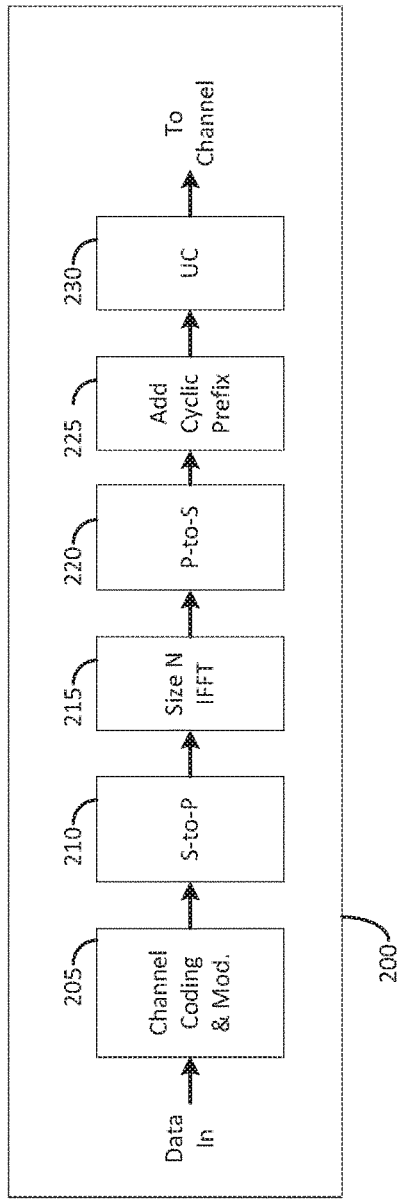
FIGS. 2A and 2B illustrate example wireless transmit and receive paths according to various embodiments of the present disclosure.
Figure 2B:
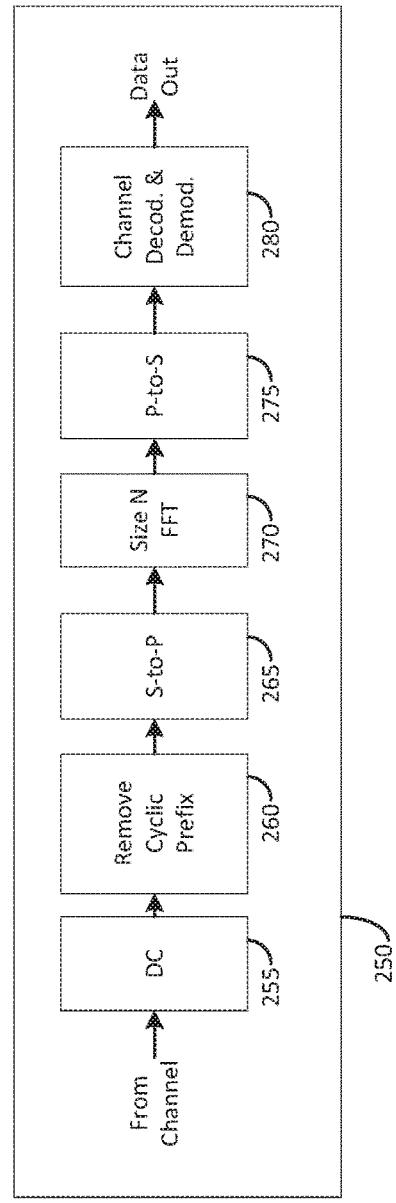

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive beam reporting information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for beam reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
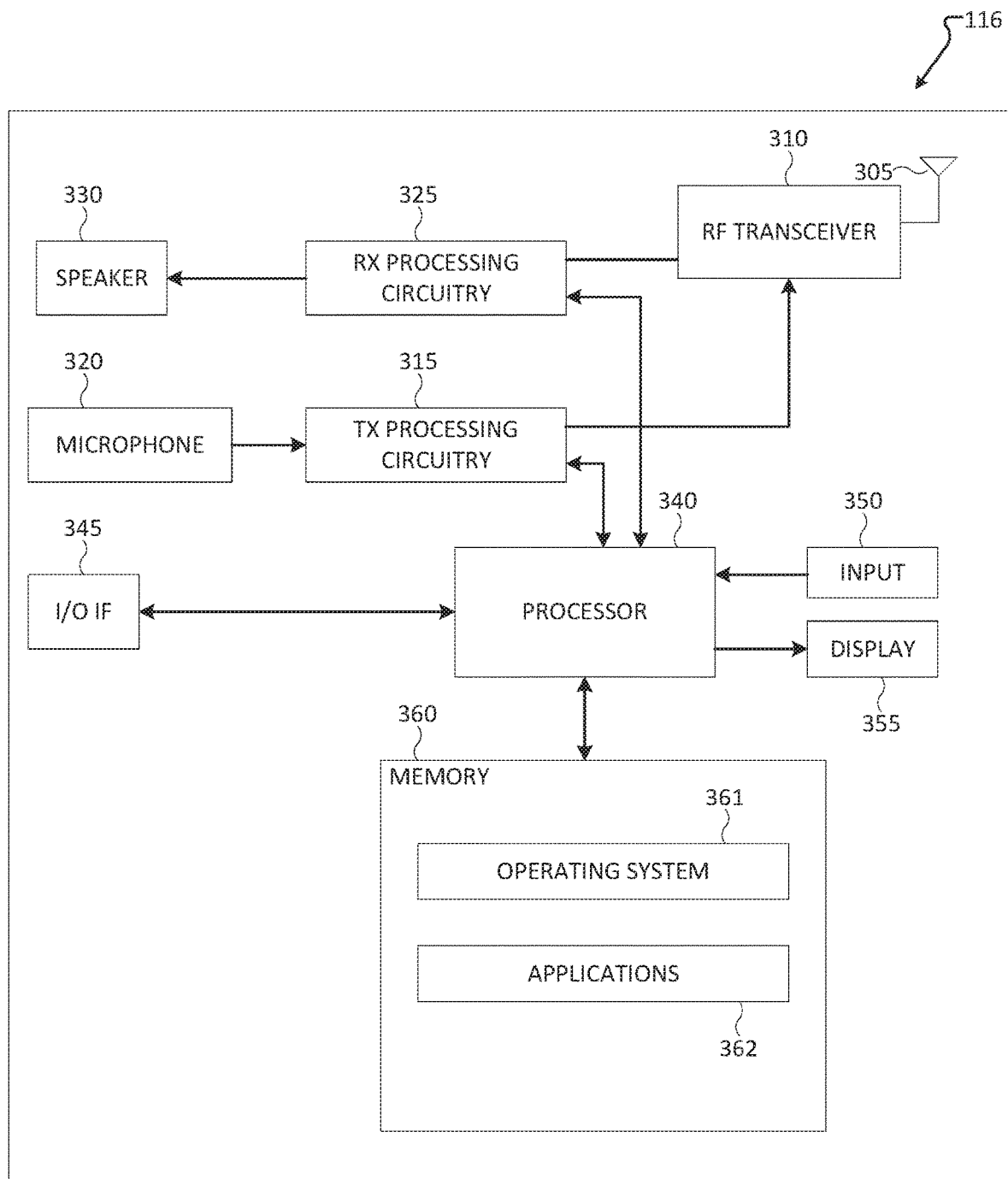
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for NZP or ZP CSI-RS reception and measurement for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
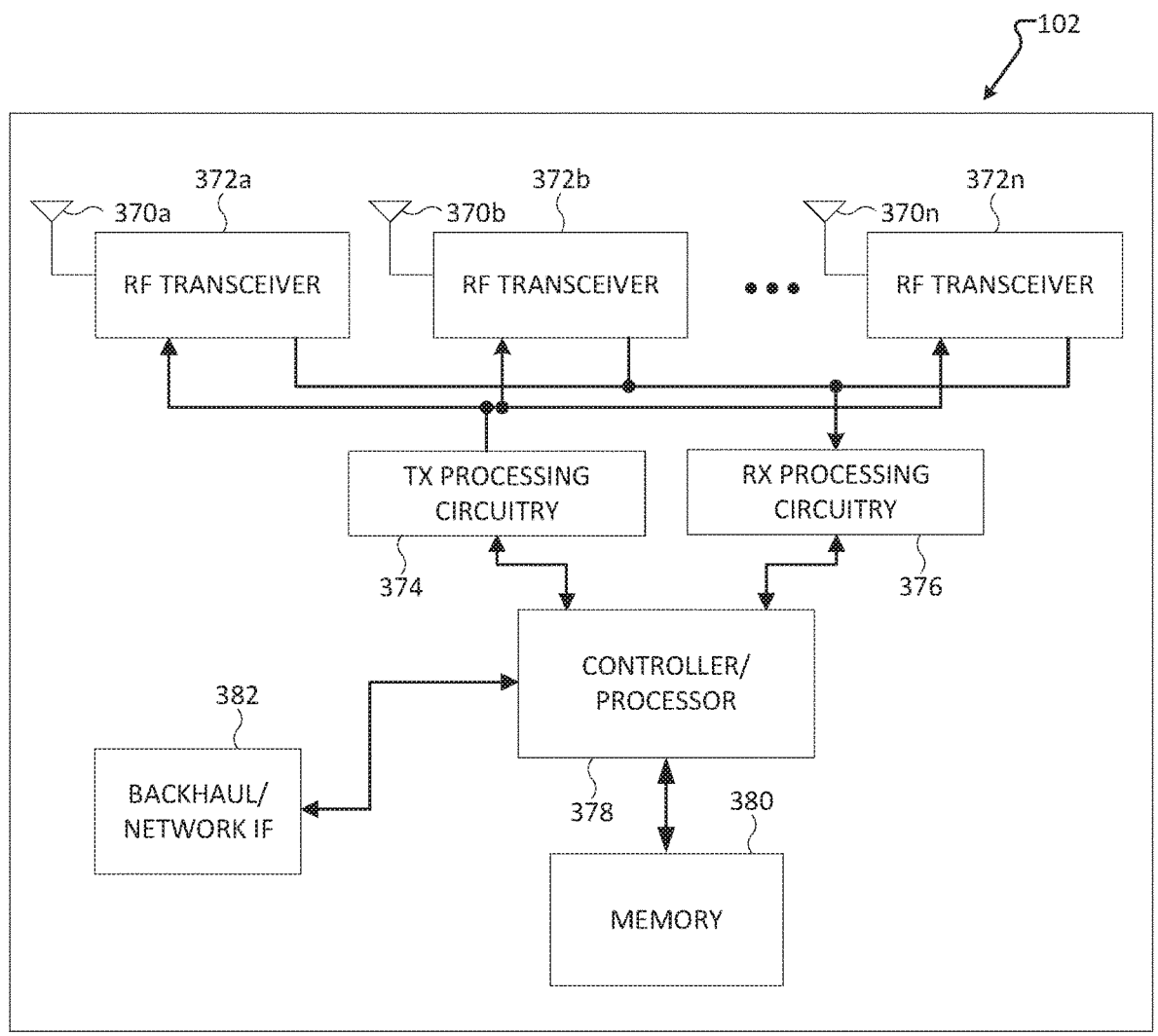
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372ndown-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/ processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmits beam reporting information to a UE.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE and Rel.15 NR. For next generation cellular systems such as 5G, it is expected that the maximum number of CSI-RS ports remain more or less the same.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of 4. For example, this transmitter may be present in the gNB 102 or the UE 116 of FIG. 1. The embodiment of the transmitter 400 shown in FIG. 4 is for illustration only, and other transmitters can have the same or similar configuration.

Figure 4:
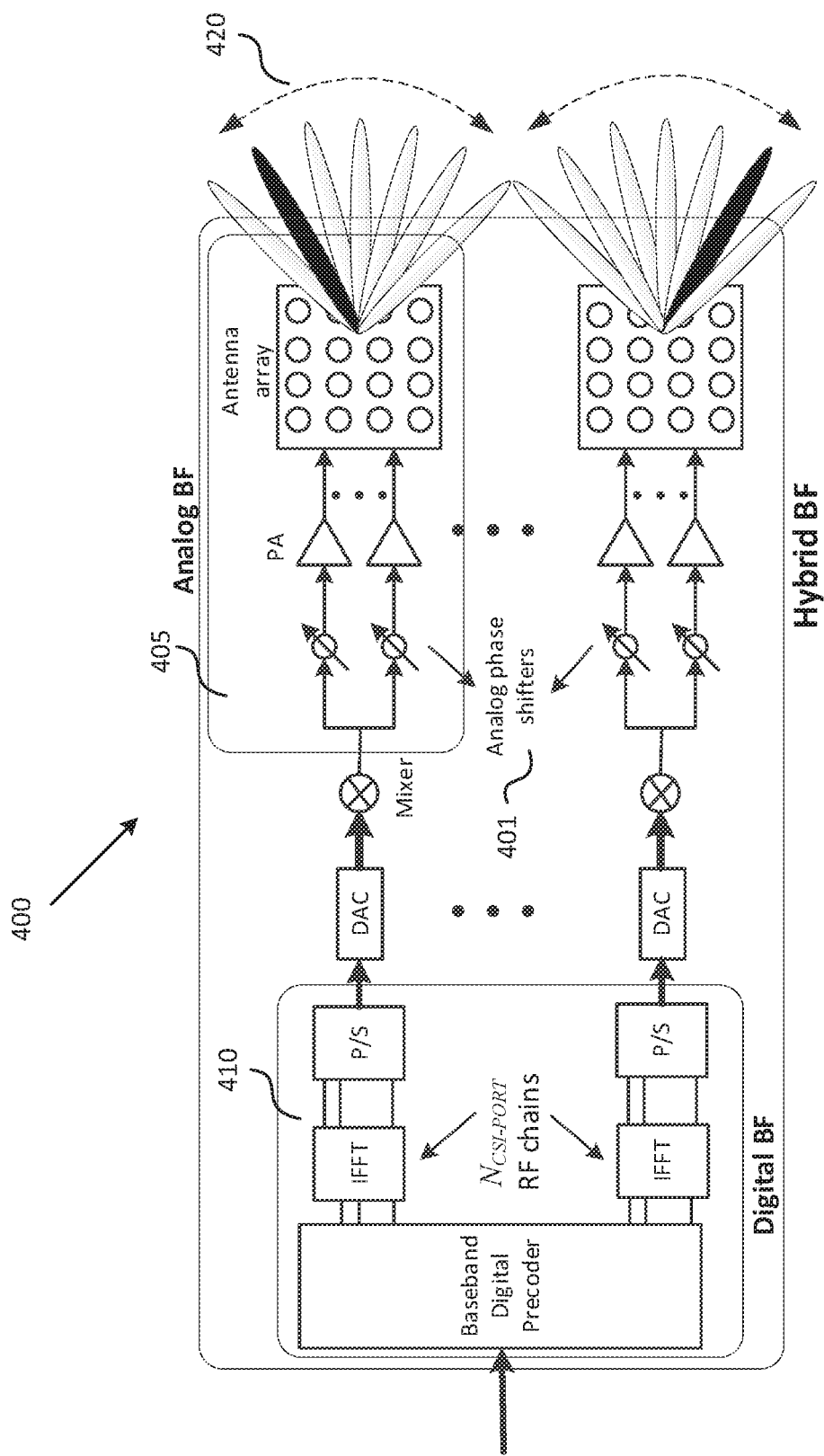
FIG. 4 illustrates an example beamforming architecture for a transmitter wherein one CSI-RS port is mapped onto a large number of analog-controlled antenna elements according to various embodiments of the present disclosure.

In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (e.g., only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (e.g., only one) reference RS. This linkage is configured via higher-layer signaling using the SpatialRelationlnfo RRC parameter. Essentially, only one TX beam may be indicated to the UE.

In Rel.15/16 NR, the most resource-efficient DL beam reporting mechanism is aperiodic (in conjunction with aperiodic CSI-RS). On the other hand, with a well-chosen periodicity, periodic beam reporting (followed by semi-persistent) results in the lowest latency at the expense of resources. Although aperiodic beam reporting seems preferred from the overall operational perspective, in a few relevant scenarios the NW/gNB lacks knowledge on the DL channel condition—or, in other words, the UE knows the DL channel condition better. In this case, it is clearly beneficial if the UE can initiate its own aperiodic beam reporting. For instance, when the UE is configured only with aperiodic beam reporting and the channel condition is worsened to the point of beam failure, the loss of link due to beam failure can be avoided if the UE can transmit an aperiodic beam report without having to wait for a beam report (CSI) request/trigger from the NW/gNB.

Although UE-initiated beam reporting can be beneficial, efficient designs are needed to ensure that the latency is reduced and, at the same time, error events can be minimized.

Therefore, there is a need for efficient designs for UE-initiated DL beam reporting that can offer good trade-off between latency and reliability.

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

The present disclosure includes several components which can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationlnfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the information to assign a particular UL TX beam to the UE.

The reference RS can be dynamically triggered by the NW/gNB (e.g. via DCI in case of aperiodic RS), preconfigured with a certain time-domain behavior (such as periodicity and offset, in case of periodic RS), or a combination of such pre-configuration and activation/deactivation (in case of semi-persistent RS).

Beam reporting can be configured as CSI reporting with reporting metric for beam management switched ON. Some examples of beam management metric are L1-RSRP and L1-SINR (with various possible embodiments).

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or >52.6 GHz (FR4), where multi-beam operation is especially relevant, transmission-reception process includes the receiver to select a receive (RX) beam for a given TX beam. For DL multi-beam operation, the UE selects a DL RX beam for every DL TX beam (which corresponds to a reference RS, represented by a TCI state). Therefore, the NW/gNB triggers or configures the UE to receive a DL RS (which is associated with a selection of DL TX beam). The UE, upon receiving and measuring the DL RS, calculates a beam report and transmits it to the gNB/NW, which in turn selects a DL TX beam. As a result, a TX-RX beam pair is derived. The NW/gNB can perform this operation for all the configured reference RS s or TCI states (either per reference RS or "beam sweeping") and determine all the TX-RX beam pairs associated with the reference RSs (TCI states) configured to the UE.

Figure 5:
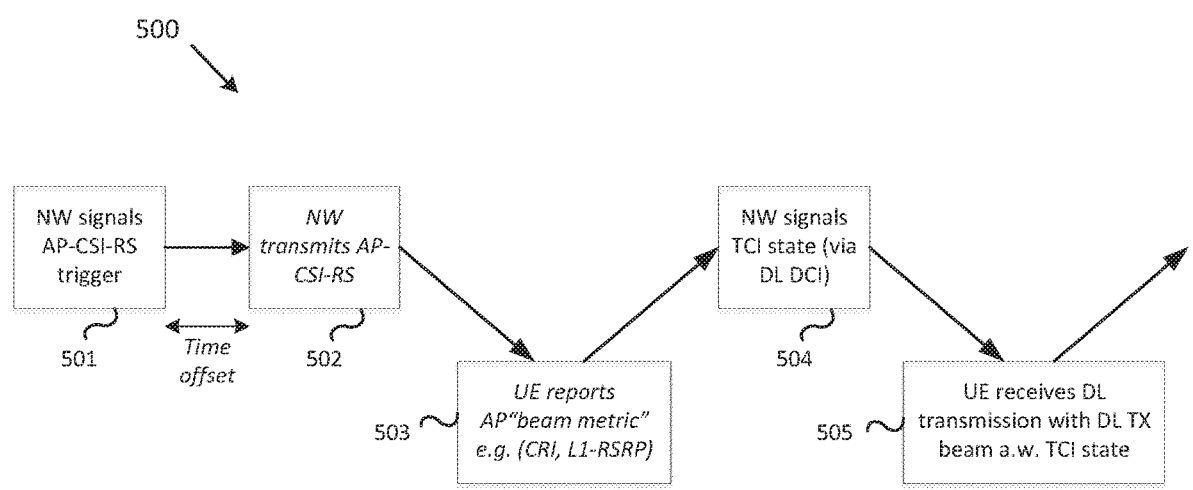
FIG. 5 illustrates a flow diagram of example aperiodic CSI-RS measurement and CSI reporting according to one or more embodiments of the present disclosure.

In one example illustrated in diagram 500 of FIG. 5 wherein a UE is configured for measuring/receiving aperiodic CSI-RS (AP-CSI-RS) and reporting aperiodic CSI (AP CSI), a DL multi-beam operation starts with the gNB/NW signaling to a UE an aperiodic CSI-RS (AP-CSI-RS) trigger or indication (step 501). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 502), the UE measures the AP-CSI-RS and, in turn, calculates and reports a "beam metric" (included in the CSI, indicating quality of a particular TX beam hypothesis) (step 503). Examples of such beam reporting (supported in Rel.15/16 NR) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 504) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 505). In this example embodiment, only one DL TX beam is indicated to the UE.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

The present disclosure includes the following components which can be used in conjunction or in combination with one another or can operate as standalone schemes. A first component includes example embodiments of UE procedures for UE-initiated or UE-triggered aperiodic beam reporting. A second component includes example embodiments for reporting content. A third component includes example embodiments for UL control information (UCI) multiplexing (with and without data).

Each of these components can be used either alone (without the other component) or in conjunction with at least one of the other components. Likewise, each of these components includes a plurality of sub-components. Each of the sub-components can be used either alone (without any other sub-component) or in conjunction with at least one of the other sub-components.

For the first component (that is, UE reporting procedures), in any of the following embodiments, beam reporting can be included in or performed separately from CSI reporting.

Figure 6:
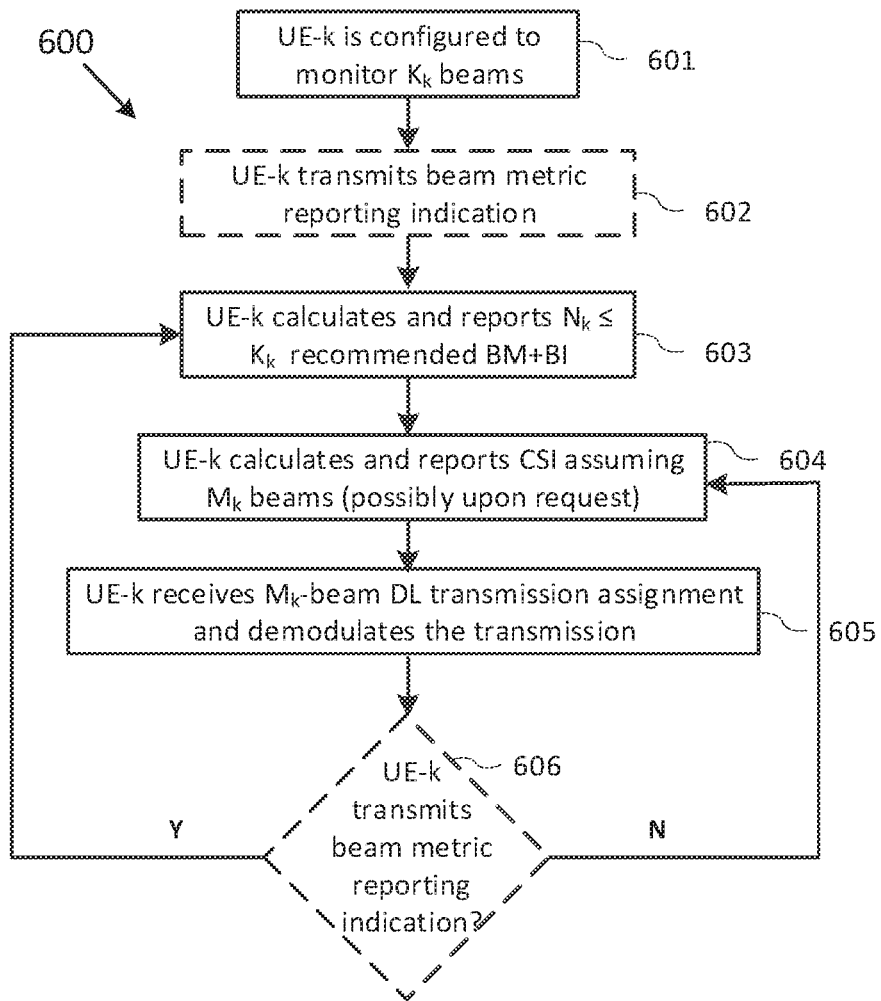
FIG. 6 illustrates a flowchart for an example of UE-initiated reporting according to one or more embodiments of the present disclosure.

The use of UE-initiated or UE-triggered reporting can be illustrated in an example flowchart 600 of FIG. 6 wherein the UE is configured to report $N_k \le K_k$ beam metrics (for example, either L1-RSRP, L1-SINR, or CSI) accompanied with a set of $N_k$ BIs $\{BI(0), BI(1), \ldots, BI(N_k-1)\}$ wherein the n-th beam metric corresponds to BI(n). The UE-k is configured to monitor/measure $K_k$ beams (step 601) where beam measurement is performed on the RS associated with the beams (such as CSI-RS). During the time when UE-k is connected to the network, instead of receiving a CSI request from the network (NW) or gNB, UE-k initiatively reports the beam metric reporting indicator followed by the associated beam metric report (either $N_k \le K_k$ beam metrics along with the associated beam indices, or all the $K_k$ beam metrics) to the network (step 602 and 603). The UE can report the beam metrics with the associated beam indices for $Z_k$ out of $N_k$ beams. When $Z_k < N_k$ and the UE had reported $N_k$ beam reports in the last reported aperiodic beam reporting (either UE-initiated or gNB/NW triggered), then the UE can also indicate the indices of $Z_k$ beam reports in the last reported aperiodic beam reporting that are replaced/updated with these "new" $Z_k$ beam reports. The value $Z_k$ is either fixed or reported by the UE or configured (via higher layer or dynamic MAC CE or DCI based signaling). Here, the UE-k recommends to the network a subset of $N_k$ beams to be used for DL data transmission to UE-k (step 703, analogous to CSI-RS ports in NR). The value of $N_k$ can be chosen by UE-k (either reported separately or included in the beam metric report) or configured/assigned by the network (dynamically, signaled via L1/L2 DL control signaling), or both (UE reporting a subset to the network, and the network assigns the subset based on or in response to UE reporting). When the value of $N_k$ is assigned by the network and signaled via L1 DL control signaling, it can be included in a DCI that requests/triggers UE-k to report aperiodic beam metric. Here the beam metrics are accompanied with the corresponding beam indices. Once the beam metric reporting is received by the network, the network can use this information to perform scheduling and link adaptation.

Subsequently, the UE is configured to measure the RS associated with the $M_k$ beams followed by CSI calculation and reporting (step 604, via an UL channel). This reporting can be performed a periodically (network requesting the report via L1 DL control channel) or periodically/semi-persistently. The CSI reporting is used for the network to perform slot-by-slot link adaptation and scheduling. If the CSI includes RI, PMI, and CQI, the network can perform a precoded DL transmission wherein a precoder is applied across the $M_k$ beams to generate a desired number of layers (transmission rank). The CQI is calculated conditioned on RI and PMI (where a codebook can be used). This precoding performs selection and/or combination of the $M_k$ beams for UE-k wherein the selection refers to selecting a subset of the $M_k$ beams and the combination refers to applying a precoder (or weights) to the selected subset of the $M_k$ beams if the selected subset comprises a plurality of beams. Optionally, if the CSI includes at least one beam metric such as SS-RSRP or CSI-RSRP or SS-SINR or CSI-SINR, each potentially accompanied with the respective CRI or SSB-RI. The number of beams $M_k$ is functionally analogous to the number of CSI-RS ports for NR. The network can select this number $M_k$ based on the value of $N_k$ reported by the UE. This value $M_k$ is dynamically signaled to UE-k via a DL channel—either together with the aperiodic CSI request (for aperiodic CSI reporting, included in the associated DCI) or separately from CSI reporting (multiplexed with some other signaling either in time- or frequency-domain). Optionally, the value $M_k$ can also be selected by UE-k itself or reported by the UE-k but assigned by the network based on or in response to UE reporting. When the UE is assigned/granted a DL transmission, the number of beams used for that particular DL transmission $M_k$ ($\leq K_k$) is signaled, either separately from or together with the DL assignment (step 605). The $M_k$ beams in step 604 can be a subset of the $N_k$ beams in step 603. In this case, the set of $M_k$ beams can be configured to the UE using a $$\left\lceil \log_2 \binom{N_k}{M_k} \right\rceil$$

bits signaling or a size-$N_k$ bitmap (via e.g. DCI). As a special case, the $M_k$ beams in step 704 can be identical to the $N_k$ beams in step 603.

Steps 604 and 605 can be repeated until UE-k initiates another aperiodic reporting (via, e.g. transmitting beam reporting indication) of $N_k \leq K_k$ beam metrics (step 606). This is done, for instance, to ensure that UE-k is assigned a good set of $N_k$ beams for the purpose of DL channel measurement for DL transmission. When this beam metric reporting request is received by UE-k, step 603 is repeated, followed by 604 and 605.

As previously described, CSI can be used for beam metric (BM) in step 603. If this is the case, step 603 and 604 yield the same type of report especially if $M_k$ is set to be equal to $N_k$. In this case, step 603 and 604 can be merged especially when UE-k is configured to report aperiodic CSI.

The core features pertaining to UE-initiated/triggered reporting are steps 602 (along with 603) and 606 in flowchart 600. In 602 and 603, UE-k initiates the beam reporting instead of waiting for the gNB/NW to request the report. Step 606 is basically the recurrence of 602 wherein UE-k keeps monitoring and measuring the pertinent measurement RS. Whether or not the UE can initiate/trigger AP beam/CSI reporting can solely be up to the UE, or it can also be configured/indicated by the gNB/NW (e.g. via higher layer or dynamic MAC CE or/and DCI signaling). Or, optionally, it is based on the $K_k$ value. For instance, if $K_k > t$, a certain threshold, then the UE can initiate/trigger beam/CSI reporting.

In the following example embodiments, at least one of the following goals can be used to design the scheme: 1) to enhance link reliability by reducing beam failure events; 2) to reduce overall latency of DL beam selection; 3) to reduce UL reporting overhead. For the first and second goals, a reference or baseline reporting scheme for improvement is P/SP beam reporting. For the third goal, a reference or baseline reporting scheme for improvement is AP beam/CSI reporting.

To attain at least one of those goals, the following potential issues need to be kept in mind: 1) susceptibility to error events, e.g. DTX (gNB failure to detect/decode), false alarm. Here, schemes that involve more steps tend to be more susceptible to error events; 2) increase in bursty UL interference (due to the altered statistics).

The following example embodiments include at least one method for UL transmission that enables UE-initiated/triggered beam reporting.

Figure 7:
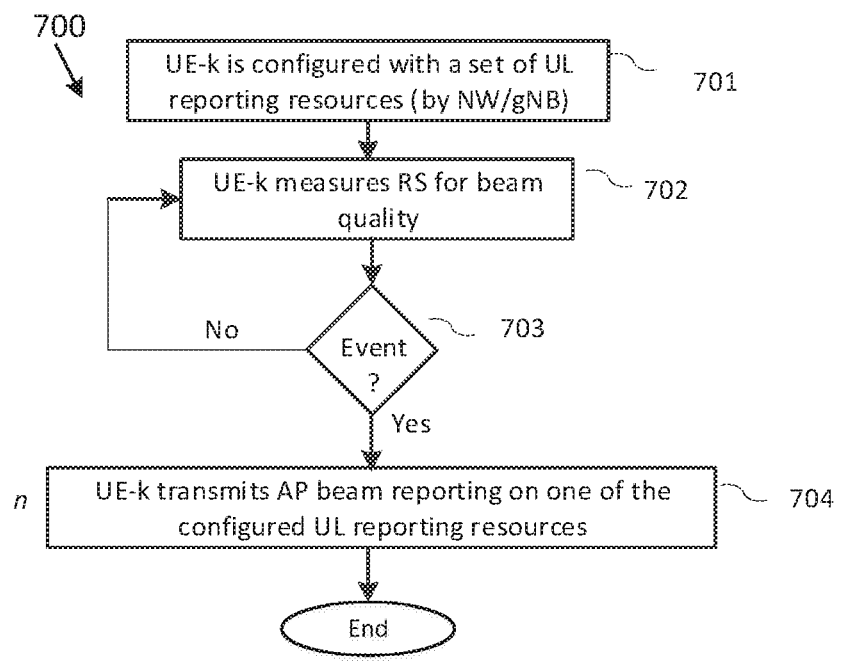
FIG. 7 illustrates a flowchart for an example of UE-initiated aperiodic beam reporting according to one or more embodiments of the present disclosure.

In one embodiment (I.1), as illustrated in flowchart 700 of FIG. 7, UE-k is configured (by the NW/gNB) with Nk UL reporting resources (701), either PUCCH resources, PUSCH resources, or a combination between PUCCH and PUSCH. This configuration can be performed via higher-layer (RRC) signaling. Optionally, the NW/gNB can signal the set of reserved resources dynamically via L1 and/or L2 DL control (PDCCH and/or MAC CE). These resources will be used for transmitting the AP beam/CSI report. In addition, UE-k is also configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. In addition, any of the measurement RSs can serve as a reference RS for beam indication (e.g. representing a TCI state). The beam metric can represent link quality associated with data (PDSCH) and/or dedicated control (PDCCH). Examples of such metric include L1-RSRP, L1-SINR, CQI, or hypothetical BLER, possibly accompanied with at least one measurement RS resource index/indicator.

As UE-k measures the RS to calculate beam quality (702), the UE, based on the calculated beam quality and/or other criteria, determines if the UE initiates an AP beam/CSI reporting (703). One of the criteria can be event-based. For example, if the beam quality metric is less than or equal to a threshold Y, UE-k will initiate AP beam/CSI reporting. This threshold Y can be fixed, pre-determined, configured via higher-layer (RRC) signaling, or dynamically signaled to the UE (via, e.g. PDCCH and/or MAC CE). The event can correspond to one particular TX beam candidate, a subset of possible TX beam candidates, or all the TX beam candidates (wherein one TX beam candidate is associated with one of the configured measurement RS resources). This measurement can be taken in one slot or over multiple slots (for instance, based on a pre-determined timing relationship and/or time-domain measurement restriction). The associated beam quality can correspond to beam metric such as L1-RSRP or L1-SINR or CQI or hypothetical BLER, measured on RS resources associated with data and/or control transmissions. It can also be associated with failure events such as beam failure detection (which represents the quality of the link used for PDCCH transmission).

If the event is declared positive, the UE transmits the AP beam/CSI reporting. This UE-initiated AP beam/CSI reporting can be transmitted over at least one of the configured or reserved Nk resources in slot n (704).

Note that on every slot (or possible set of slots, configured or predetermined) the NW/gNB determines whether the UE transmits an aperiodic (AP) reporting or not. Therefore, UE-k does not send any pre-reporting notification. With respect to 600 of FIG. 6, step 603 is performed without 602. Here, the UE can (autonomously) select a subset of the configured or reserved Nk resources. There are at least several possibilities. First, if the AP beam/CSI reporting includes an indication of the selected UL reporting resource(s), the gNB can infer the selected UL reporting resource(s) by decoding the AP beam/CSI reporting. Second, if the AP beam/CSI reporting does not include any indication of the selected UL reporting resource(s) but UE-k selects the resource(s) based on a pre-determined rule(s), the gNB can infer the selected UL reporting resource(s) from the rule(s). Third, if the AP beam/CSI reporting does not include any indication of the selected UL reporting resource(s) and UE-k 'randomly' selects the resource(s), the gNB may be required to perform blind decoding across the Nk configured/reserved UL reporting resources. Such blind decoding involves first detecting the presence of UCI (via, e.g. CRC check). If the presence of UCI is detected, the content of UCI can be decoded.

This embodiment results in the lowest latency since the AP beam/CSI reporting is performed in one step. However, missed detection or false alarm (on each of the $N_k$ hypotheses) can occur more frequently. Here, error detection mechanism is beneficial, e.g. CRC check on UCI (append CRC on UCI), or syndrome-based decoding for LDPC. Furthermore, it is beneficial to introduce a mechanism to differentiate UCI-only from UCI+data as well as data-only.

In addition, the configured UL reporting resources, whenever unused for AP beam/CSI reporting, can also be used for data transmission. In this case, content-dependent CRC (or content-dependent error detection mechanism, such as scrambling) can be used.

Figure 8:
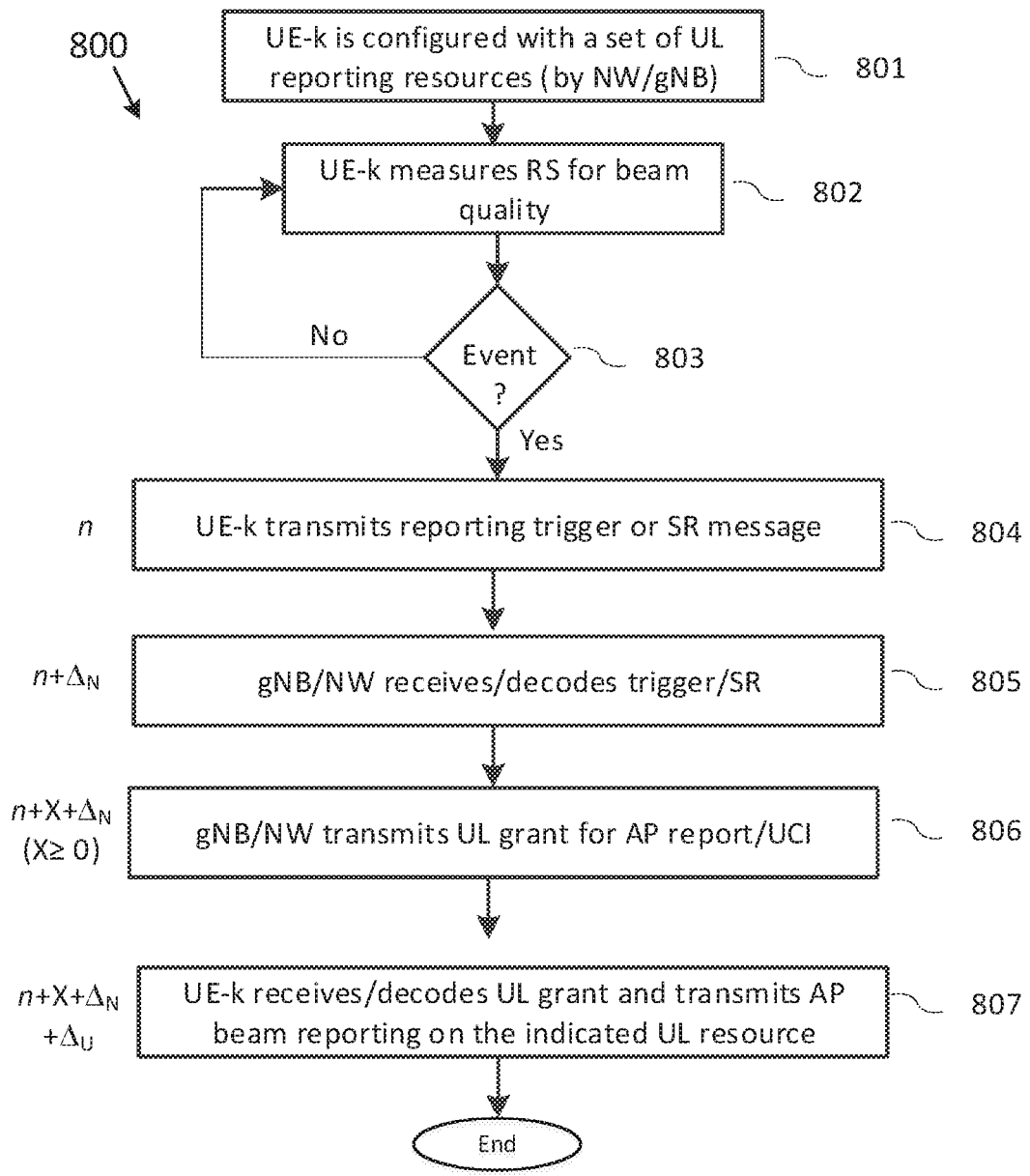
FIG. 8 illustrates a flowchart for another example UE-initiated aperiodic beam reporting according to one or more embodiments of the present disclosure.

In another embodiment (I.2), as illustrated in flowchart 800 of FIG. 8, UE-k is configured (by the NW/gNB) with Nk UL reporting resources (801), either PUCCH resources, PUSCH resources, or a combination between PUCCH and PUSCH. This configuration can be performed via higher-layer (RRC) signaling.

Optionally, the NW/gNB can signal the set of reserved resources dynamically via L1 and/or L2 DL control (PDCCH and/or MAC CE). These resources will be used for transmitting the AP beam/CSI report. In addition, UE-k is also configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. In addition, any of the measurement RSs can serve as a reference RS for beam indication (e.g. representing a TCI state). The beam metric can represent link quality associated with data (PDSCH) and/or dedicated control (PDCCH). Examples of such metric include L1-RSRP, L1-SINR, CQI, or hypothetical BLER, possibly accompanied with at least one measurement RS resource index/indicator.

As UE-k measures the RS to calculate beam quality (802), the UE, based on the calculated beam quality and/or other criteria, determines if the UE initiates an AP beam/CSI reporting (803). One of the criteria can be event-based. For example, if the beam quality metric is less than or equal to a threshold Y, UE-k will initiate AP beam/CSI reporting. This threshold Y can be fixed, pre-determined, configured via higher-layer (RRC) signaling, or dynamically signaled to the UE (via, e.g. PDCCH and/or MAC CE). The event can correspond to one particular TX beam candidate, a subset of possible TX beam candidates, or all the TX beam candidates (wherein one TX beam candidate is associated with one of the configured measurement RS resources). This measurement can be taken in one slot or over multiple slots (for instance, based on a pre-determined timing relationship and/or time-domain measurement restriction). The associated beam quality can correspond to beam metric such as L1-RSRP or L1-SINR or CQI or hypothetical BLER, measured on RS resources associated with data and/or control transmissions. It can also be associated with failure events such as beam failure detection (which represents the quality of the link used for PDCCH transmission).

If the event is declared positive, the UE first transmits a reporting trigger message to the NW/gNB to request for an UL grant (which includes AP CSI request) for transmitting the AP beam/CSI reporting (step 804) in slot n. This could be analogous to Scheduling Request (SR). After the gNB/NW receives and decodes the reporting trigger message in slot n+X+$\Delta_N$ (step 805), the gNB/NW transmits an UL grant (e.g. on PDCCH) to the UE which includes AP CSI request (step 806) in slot n+X+$\Delta_N$ where X is the additional processing time. As the UE receives and decodes the UL grant, the UE transmit the AP beam/CSI reporting on an UL reporting resource in slot n+X+$\Delta_N$+$\Delta_U$ (807).

With respect to 600 of FIG. 6, step 602 is first performed, followed by 603. Here, the UE can (autonomously) select a subset of the configured or reserved $N_k$ resources. There are at least several possibilities. First, if the AP beam/CSI reporting includes an indication of the selected UL reporting resource(s), the gNB can infer the selected UL reporting resource(s) by decoding the AP beam/CSI reporting. In this case, the NW/gNB can indicate the resource allocation for the AP beam/CSI reporting in the UL grant (step 806). Optionally, the indication of the selected UL reporting resource(s) can also be included in the UE reporting trigger or SR (step 804). In this case, the NW/gNB can follow the UL resource selection from the UE without having to indicate the UL reporting resource(s) in in the UL grant, or the NW/gNB can still indicate the resource allocation for the AP beam/CSI reporting in the UL grant (this is beneficial if the UL reporting resource indication is not successfully received/decoded. Second, if the AP beam/CSI reporting does not include any indication of the selected UL reporting resource(s) but UE-k selects the resource(s) based on a pre-determined rule(s), the gNB can infer the selected UL reporting resource(s) from the rule(s). Third, if the AP beam/CSI reporting does not include any indication of the selected UL reporting resource(s) and UE-k 'randomly' selects the resource(s), the gNB may be required to perform blind decoding across the Nk configured/reserved UL reporting resources. Such blind decoding involves first detecting the presence of UCI (via, e.g. CRC check). If the presence of UCI is detected, the content of UCI can be decoded.

This embodiment does not require the NW/gNB to perform blind decoding thereby the least imposing one in terms of gNB baseband complexity. It is arguably the most efficient in terms of UL reporting resource. However, this embodiment results in increased latency (compared to I.1, the latency increases by X+$\Delta_N$+$\Delta_U$). In addition, since this embodiment involves more steps, it may be more prone to error events especially if the gNB/NW fails to correctly receive the SR, either due to first-order DTX/missed detection (lost reporting request/opportunity, which could further cause the UE to expect an UL grant and thereby susceptible to a second-order false alarm) or first-order false alarm (which will cause increased DL interference, wasted UL resource allocation). This is likely since SR typically lacks error detection capability. On the other hand, missed detection of UL is less likely since UL grant is typically CRC protected.

Figure 9:
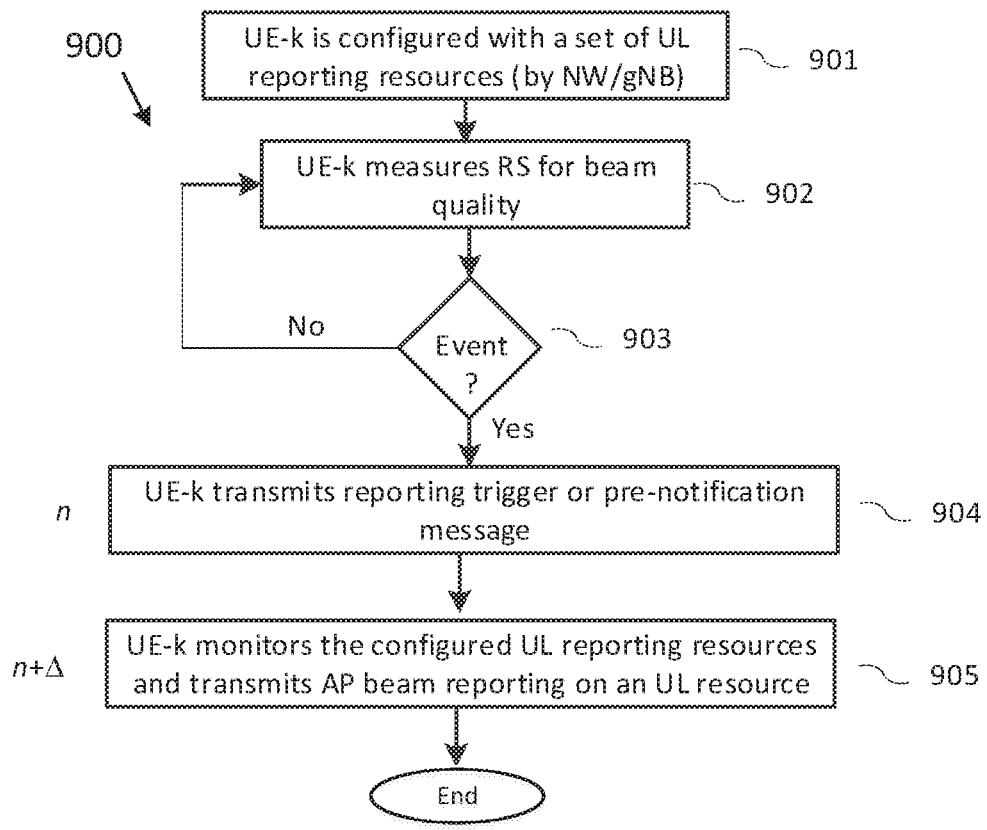
FIG. 9 illustrates a flowchart for another example UE-initiated aperiodic beam reporting according to one or more embodiments of the present disclosure.
Figure 10:
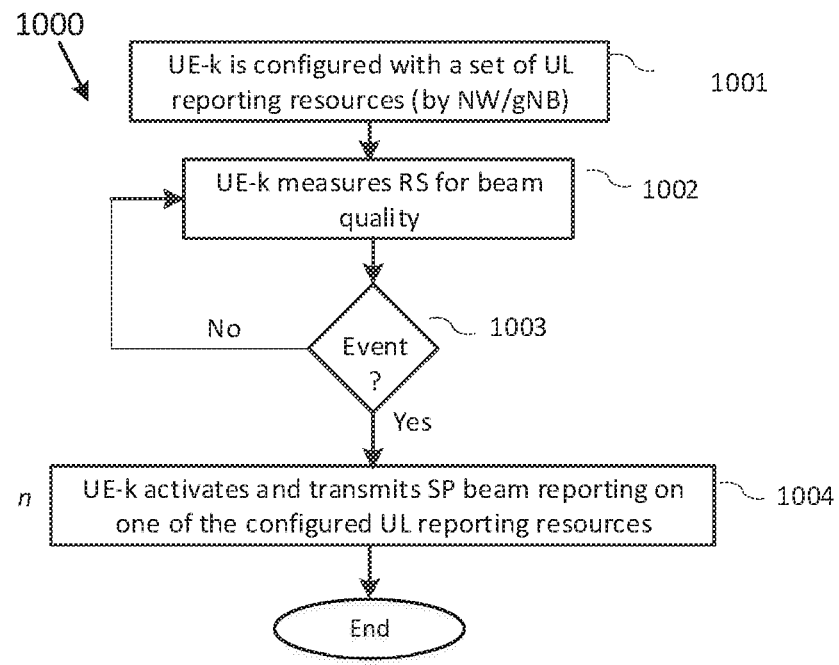
FIG. 10 illustrates a flowchart for an example UE-initiated semi-persistent beam reporting according to one or more embodiments of the present disclosure.
Figure 11:
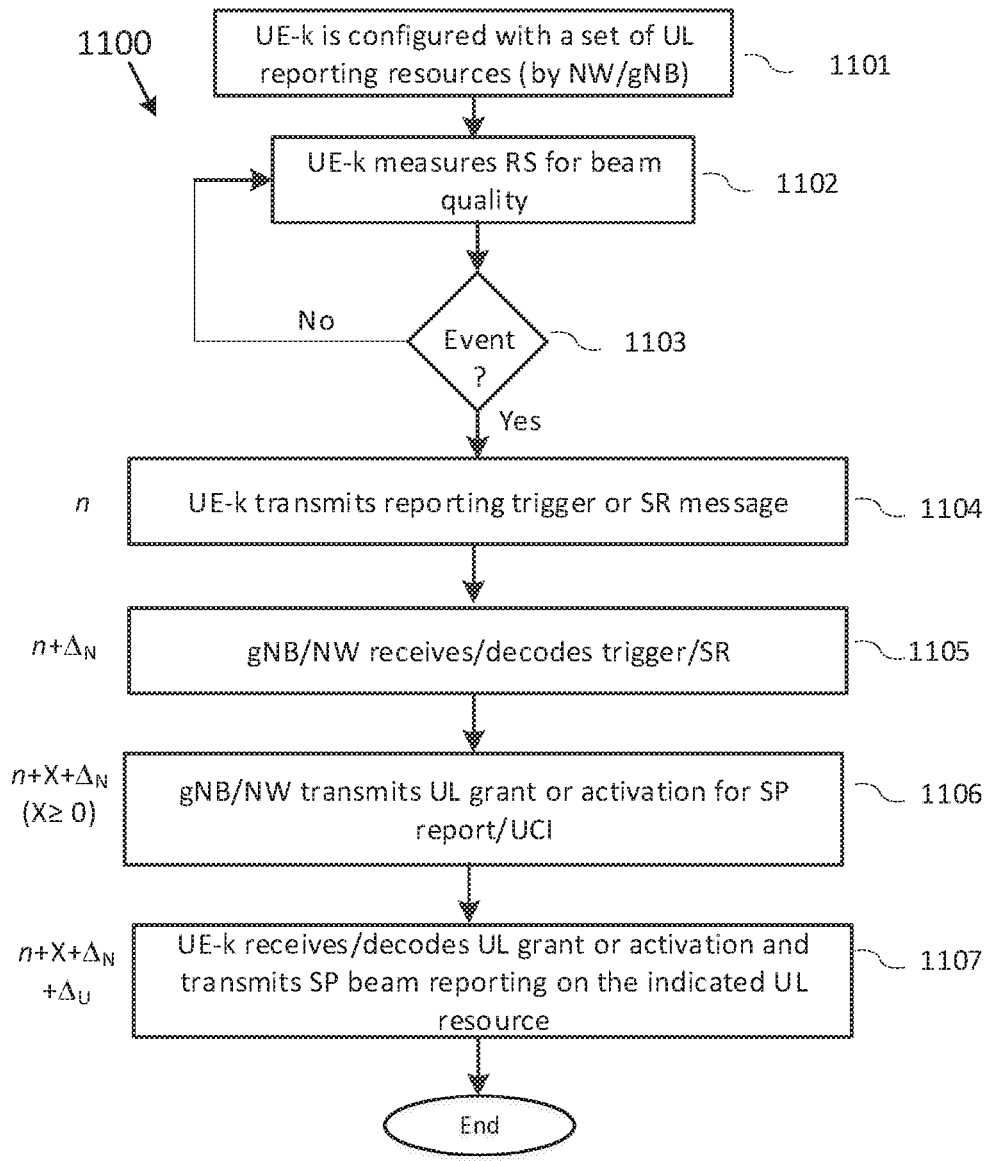
FIG. 11 illustrates a flowchart for another example UE-initiated semi-persistent beam reporting according to one or more embodiments of the present disclosure.
Figure 12:
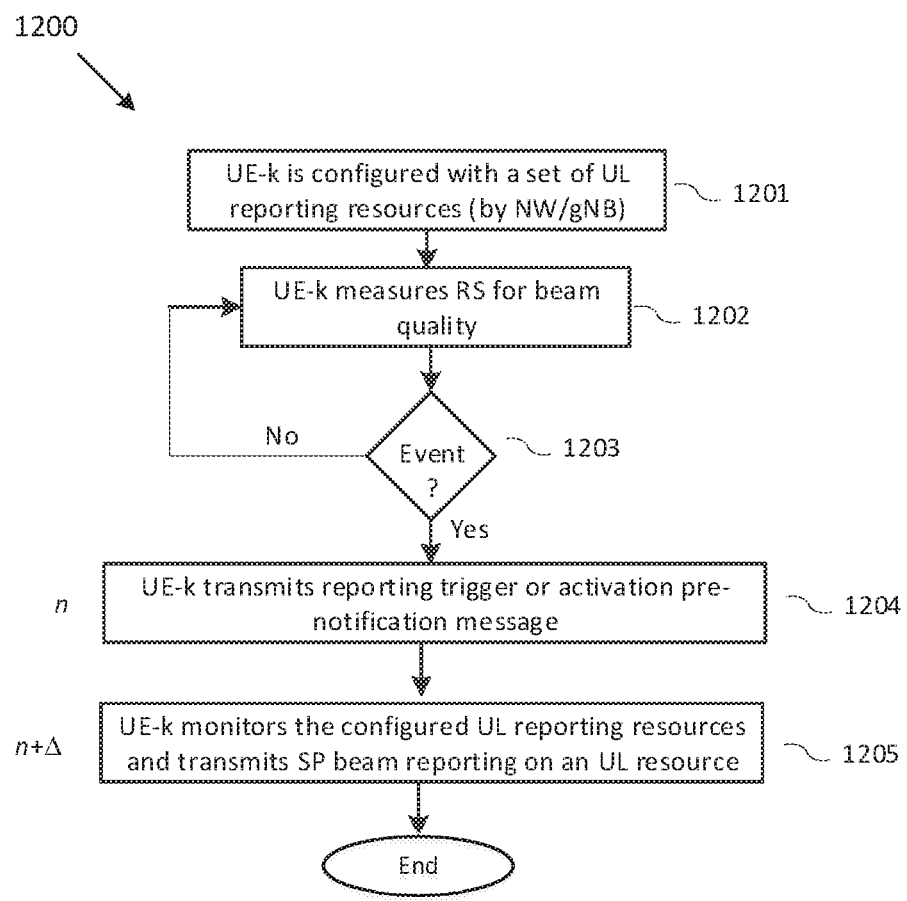
FIG. 12 illustrates a flowchart for another example UE-initiated semi-persistent beam reporting according to one or more embodiments of the present disclosure.

In another embodiment (I.3), as illustrated in flowchart 900 of FIG. 9, UE-k is configured (by the NW/gNB) with $N_k$ UL reporting resources (901), either PUCCH resources, PUSCH resources, or a combination between PUCCH and PUSCH. This configuration can be performed via higher-layer (RRC) signaling.

Optionally, the NW/gNB can signal the set of reserved resources dynamically via L1 and/or L2 DL control (PDCCH and/or MAC CE). These resources will be used for transmitting the AP beam/CSI report. In addition, UE-k is also configured with at least one measurement RS resource such as CSI-RS (NZP and/or ZP CSI-RS), SSB, or other RS types such as SRS (e.g. if beam correspondence holds). The measurement RSs are utilized to measure channel and/or beam quality such as CSI and/or beam metric. In addition, any of the measurement RSs can serve as a reference RS for beam indication (e.g. representing a TCI state). The beam metric can represent link quality associated with data (PDSCH) and/or dedicated control (PDCCH). Examples of such metric include L1-RSRP, L1-SINR, CQI, or hypothetical BLER, possibly accompanied with at least one measurement RS resource index/indicator.

As UE-k measures the RS to calculate beam quality (902), the UE, based on the calculated beam quality and/or other criteria, determines if the UE initiates an AP beam/CSI reporting (903). One of the criteria can be event-based. For example, if the beam quality metric is less than or equal to a threshold Y, UE-k will initiate AP beam/CSI reporting. This threshold Y can be fixed, pre-determined, configured via higher-layer (RRC) signaling, or dynamically signaled to the UE (via, e.g. PDCCH and/or MAC CE). The event can correspond to one particular TX beam candidate, a subset of possible TX beam candidates, or all the TX beam candidates (wherein one TX beam candidate is associated with one of the configured measurement RS resources). This measurement can be taken in one slot or over multiple slots (for instance, based on a pre-determined timing relationship and/or time-domain measurement restriction). The associated beam quality can correspond to beam metric such as L1-RSRP or L1-SINR measured on RS resources associated with data and/or control transmissions. It can also be associated with failure events such as beam failure detection (which represents the quality of the link used for PDCCH transmission).

If the event is declared positive, the UE first transmits a reporting trigger message or pre-notification message to the NW/gNB (step 904). However, unlike in embodiment I.2 where the message functions as a "scheduling request", this pre-notification message is transmitted as a notification to the NW/gNB that the UE is about to transmit an AP beam/CSI reporting Δ slots later. That is, UE-k does not wait for an UL grant to transmit the AP beam/CSI reporting. It simply gives the NW/gNB sometime to receive and process (decode) the pre-notification message so that the NW/gNB is aware that the report is coming. Optionally, the indication of the selected UL reporting resource(s) can also be included in the pre-notification message. The offset Δ can be pre-determined/fixed, configured via higher-layer (RRC) signaling, or signaled to UE-k via L1 (PDCCH, either UE-specific or UE-group DCI) or L2 (MAC CE) DL control channel or a combination of the two. The pre-notification message can be transmitted on PUCCH (as a standalone message or multiplexed with other UCI or HARQ-ACK) or PUSCH (UCI-only or also multiplexed with data).

If the indication of the selected UL reporting resource(s) is not included in the pre-notification message, between slot n (transmission of pre-notification message) and n+Δ (transmission of AP beam/CSI reporting), UE-k can monitor PDCCH for the presence of an UL grant with resource allocation including any subset of the Nk pre-configured UL reporting resources. Optionally, the UE can simply check if that is the case only in slot (n+Δ−1) or (n+Δ). This is performed to see if any of the $N_k$ pre-configured UL reporting resources is used for other purposes, i.e. "grant-based" UCI and/or data transmission. By doing so, UE-k can select any subset of the $N_k$ pre-configured UL reporting resources that are free (unused) for the purpose of the UE-triggered/initiated AP beam/CSI reporting in slot n+Δ (step 905). In this case, UE-k can be expected to monitor the presence of UL grant(s) for itself (i.e. whether the UL reporting resource(s) pre-configured for UE-k are used for other UEs should not concern UE-k and is left to the NW/gNB).

If the indication of the selected UL reporting resource(s) is included in the pre-notification message, UE-k can choose any from the $N_k$ pre-configured UL reporting resources. By doing so, if/when the NW/gNB receives the pre-notification message transmitted in slot n, the NW/gNB may know that the UL reporting resource(s) indicated in the pre-notification message cannot be used in any UL grant for UE-k in slot n+Δ.

With respect to 600 of FIG. 6, step 602 is first performed, followed by 603. Here, the UE can (autonomously) select a subset of the configured or reserved Nk resources. There are at least several possibilities. First, if the AP beam/CSI reporting includes an indication of the selected UL reporting resource(s), the gNB can infer the selected UL reporting resource(s) by decoding the AP beam/CSI reporting. Or, optionally, if the indication of the selected UL reporting resource(s) is included in the pre-notification message, the gNB can infer the selected UL reporting resource(s) by decoding the pre-notification message. Second, if the AP beam/CSI reporting does not include any indication of the selected UL reporting resource(s) but UE-k selects the resource(s) based on a set of fixed/pre-determined rule(s), the gNB can infer the selected UL reporting resource(s) from the rule(s). Third, if the AP beam/CSI reporting does not include any indication of the selected UL reporting resource(s) and UE-k 'randomly' selects the resource(s), the gNB may be required to perform blind decoding across the Nk configured/reserved UL reporting resources. Such blind decoding involves first detecting the presence of UCI (via, e.g. CRC check). If the presence of UCI is detected, the content of UCI can be decoded. Regarding the pool for UL reporting resource selection, the following possibilities exist. First, it can be done from all the pre-configured or reserved Nk resources. Second, optionally, it can be done from a subset of the pre-configured or reserved Nk resources not used in at least one UL grant as described in the previous paragraph, i.e. between slot n (transmission of pre-notification message) and n+Δ (transmission of AP beam/CSI reporting), or slot (n+Δ−1), or (n+Δ).

This embodiment may require the NW/gNB to perform blind decoding if the selected UL reporting resource is not indicated. In terms of latency and resource usage efficiency, it is in between embodiments I.1 and I.2. While it does not involve as many steps as embodiment I.3, it is still susceptible to missed detection and false alarm in decoding the trigger/pre-notification message.

For any of the above embodiments, the condition for transmitting AP beam/CSI reporting (steps 703, 803, or 903) is based on at least one measurement-based event. Other conditions can also be used. Optionally, the condition or event does not have to be specified. That is, the UE can initiate an AP beam/CSI reporting by itself without any specified condition. This can be relevant if a number of different link/channel conditions are expected to warrant UE-initiated/triggered AP beam/CSI reporting.

For any of the above embodiments, the beam/CSI reporting is assumed to be aperiodic (AP) wherein the UE reports one reporting instance. Any of the above embodiments can also be extended to semi-persistent (SP) beam/CSI reporting (which involves activation and deactivation of the SP report and, if SP CSI-RS is used, its corresponding measurements). Several options are possible. In a first option, when the condition for transmitting SP beam/CSI reporting is fulfilled, the UE activates the SP beam/CSI reporting and, depending on the scheme, starts to transmit the report. At least one of the periodicity, slot offset, and/or the number of reporting instances can be either pre-determined/fixed, configured via higher-layer (RRC) signaling, or signaled to the UE via L1 (PDCCH, either UE-specific or UE-group DCI) and/or L2 (MAC CE) DL control channel. A second option is similar to the first option except that at least one of the periodicity, slot offset, and/or the number of reporting instances can be chosen by the UE and reported to the NW/gNB either separately or together with the SP beam/CSI reporting. Therefore, the embodiments in FIGS. 7, 8, and 9 for aperiodic reporting can be extended to those illustrated in FIGS. 10, 11, and 12, respectively, for semi-persistent reporting as follows. In any of the extension below, deactivation of SP reporting is not shown. Here, deactivation can be accomplished either implicitly (e.g. via gNB/NW configuration and UE selection of the number of reporting instances) or explicitly (the UE sending a deactivation request/notification to the gNB/NW which can be signaled separately or together with the SP beam/CSI reporting). The SP beam/CSI reporting can be performed either via PUCCH, PUSCH, or a combination of the two.

For the second component (that is, reporting content), for any of the embodiments described in component 1, the beam/CSI reporting can comprise a beam metric (such as L1-RSRP, L1-SINR, or a hypothetical BLER) that represents link quality for data and/or dedicated control. If data and control TX beams can be the same (unlike in Rel.15/16), the same beam metric can be used to represent both data and control.

Optionally, the beam/CSI reporting can comprise a measure or status for beam failure event on dedicated control (PDCCH). The failure event can be defined in several options. In one option, beam failure event is declared when at least one of the candidate TX beams (associated with the configured CSI-RS or SSB resources for beam management) fails. In another option, beam failure is declared when all of the candidate TX beams (associated with the configured CSI-RS or SSB resources for beam management) fails. A failure for a TX beam candidate can correspond to the associated beam metric falling below a given threshold. If reported beam metric represents the quality of dedicated control reception, this may be unnecessary.

For the third component (that is, UCI multiplexing), for any of the embodiments described in component 1, the UCI can be reported alone or transmitted/multiplexed together with data.

When the UCI is transmitted without data, the associated beam/CSI reporting can be transmitted either via PUCCH or PUSCH.

When the UCI is multiplexed with data, the associated beam/CSI reporting can be transmitted via PUSCH. In this case, the two-part UCI (comprising part 1 UCI and part 2 UCI, analogous to two-part UCI in Rel. 15) can be used, wherein the part 1 UCI indicates whether event is positive and negative, and if the event is positive, then the part 2 UCI including the AP beam/CSI using the configured/reserved UL reporting resources. The part 1 UCI can be reported using the first subset of the Nk resources, and the part 2 UCI can be reported using a second subset of the remaining resources (according to the three methods explained above). When the AP beam/CSI reporting includes an indication of the selected UL reporting resource(s), this indication can also be included in part 1 UCI. When the SP beam/CSI reporting includes an indication of the selected UL reporting resource(s) and/or (optionally) information on periodicity, slot offset, and/or the number of reporting instances, at least one of this information can be included in part 1 UCI.

Any of the above variation embodiments can be utilized independently or in combination with at least one other variation embodiment.

Figure 13:
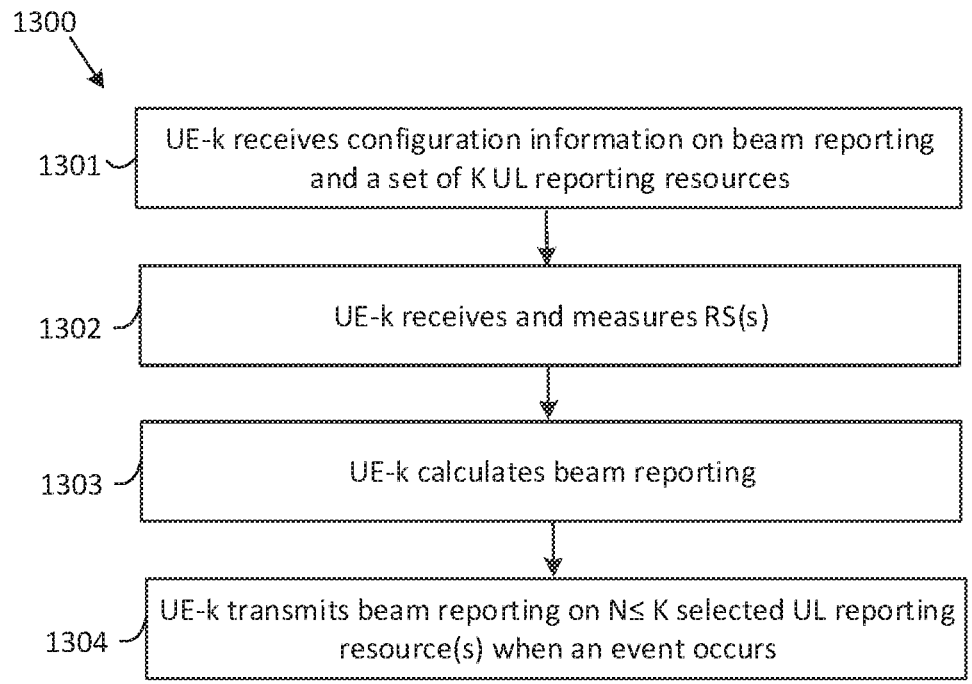
FIG. 13 illustrates a flowchart for an example method wherein a UE receives configuration information on beam reporting and UL reporting resource according to one or more embodiments of the present disclosure.

FIG. 13 illustrates a flowchart for an example method 1300 wherein a UE receives configuration information on beam reporting and UL reporting resource according to an embodiment of the present disclosure. For example, the method 1300 can be performed by the UE 116. The embodiment of the method 1300 shown in FIG. 13 is for illustration only.

The method 1300 begins with the UE (termed UE-k) receiving, from a base station, configuration information on beam reporting and UL reporting resource wherein a set of K UL reporting resources are configured for UE-k (step 1301). UE-k also receives and measures at least one RS resource (step 1302) for calculating the beam reporting (1303). When an event occurs, UE-k transmits the beam reporting on a selected N-subset (i.e., N≤K) of UL reporting resources (step 1304).

The beam reporting can include at least one beam metric (such as CSI-RSRP, CSI-SINR, SSB-RSRP, SSB-SINR, or any combination or modification thereof) or CQI, each accompanied by the respective CRI or SSB-RI. Consequently, any one of the RS resources can be CSI-RS or SSB or, if beam correspondence holds, SRS. For 5G NR the UL reporting resource can be allocated on PUCCH, PUSCH, or a combination of the two. If the beam reporting includes beam metric, the event can include at least one of the RSRP or SINR value smaller than a threshold. This indicates that the beam quality is degrading, and UE-k is to let the gNB/network know.

While such UE-initiated/triggered beam reporting can be performed once the event occurs, at least two other options are available. In one option, UE-k can transmit a reporting trigger and, subsequently, wait for receiving an uplink grant prior to transmitting the beam reporting. In another option, UE-k can transmit a reporting pre-notification message prior to transmitting the beam reporting (that is, without waiting for receiving an uplink grant). For this option, the reporting pre-notification message includes an information on the N selected UL reporting resource(s).

Figure 14:
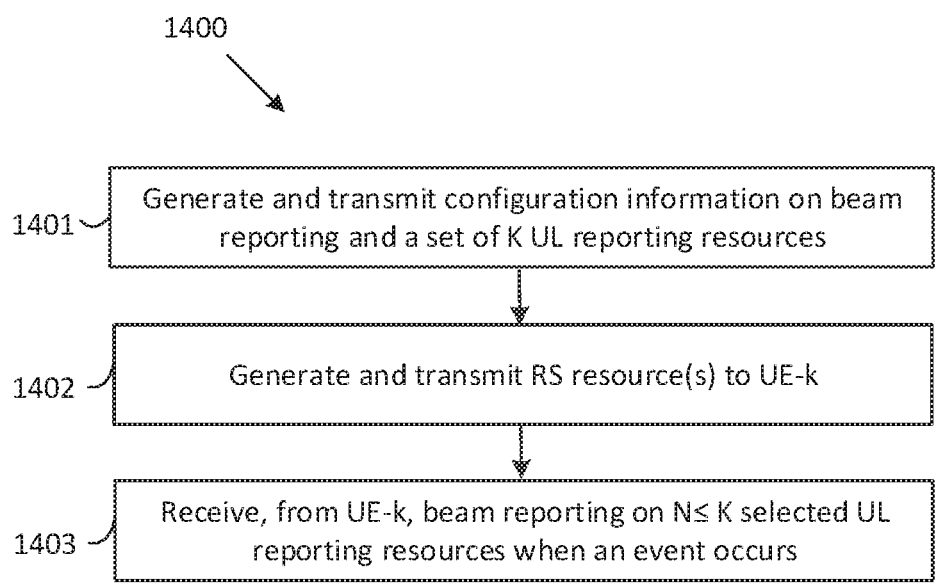
FIG. 14 illustrates a flowchart for an example method wherein a BS generates a configuration information on beam reporting and UL reporting resource according to one or more embodiments of the present disclosure.

FIG. 14 illustrates a flowchart for an example method 1400 wherein a BS generates configuration information on beam reporting and UL reporting resource to a UE (labeled as UE-k) according to an embodiment of the present disclosure. For example, the method 1400 can be performed by the BS 102. The embodiment of the method 1400 shown in FIG. 14 is for illustration only.

The method 1400 begins with the BS generating and transmitting, to UE-k begins with the UE receiving, from a base station, configuration information on beam reporting and UL reporting resource wherein a set of K UL reporting resources are configured for UE-k (step 1401). The BS also generates and transmits at least one RS resource (step 1402) for UE-k to calculate the beam reporting. When an event occurs (determined at UE-k), the BS receives the beam reporting on a selected N-subset (i.e., N≤K) of UL reporting resources (step 1303).

The beam reporting can include at least one beam metric (such as CSI-RSRP, CSI-SINR, SSB-RSRP, SSB-SINR, or any combination or modification thereof) or CQI, each accompanied by the respective CRI or SSB-RI. Consequently, any one of the RS resources can be CSI-RS or SSB or, if beam correspondence holds, SRS. For 5G NR the UL reporting resource can be allocated on PUCCH, PUSCH, or a combination of the two. If the beam reporting includes beam metric, the event can include at least one of the RSRP or SINR value smaller than a threshold. This indicates that the beam quality is degrading, and UE-k is to let the gNB/network know.

While such UE-initiated/triggered beam reporting can be performed once the event occurs, at least two other options are available. In one option, the BS can wait for receiving a reporting trigger and, subsequently, transmits an uplink grant prior to receiving the beam reporting. In another option, the BS can wait for receiving a reporting pre-notification message prior to receiving the beam reporting (that is, without transmitting an uplink grant to UE-k). For this option, the reporting pre-notification message includes an information on the N selected UL reporting resource(s).

Although FIGS. 13 and 14 illustrate examples of methods for receiving configuration information and configuring a UE, respectively, various changes can be made to FIGS. 13 and 14. For example, while shown as a series of steps, various steps in each figure can overlap, occur in parallel, occur in a different order, occur multiple times, or not be performed in one or more embodiments.

Although the present disclosure has been described with example embodiments, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to:
receive, from a base station (BS), configuration information on a beam reporting;
receive configuration information on a set of uplink (UL) reporting resources; and
receive at least one reference signal (RS) resource; and
a processor operably connected to the transceiver, the processor configured to:
measure the at least one RS resource for calculating the beam reporting;
determine that an event occurs based on detecting that a value for at least one of a reference signal received power (RSRP) or a signal to interference-plus-noise ratio (SINR) is smaller than a threshold, wherein the threshold is signaled to the UE by the BS; and
in response to determining that the event occurs, calculate the beam reporting, wherein the transceiver is further configured to:
transmit a reporting pre-notification message in response to occurrence of the event, the reporting pre-notification message configured to notify the BS that the UE will transmit the beam reporting; and
transmit the beam reporting on at least one UL reporting resource from the set of UL reporting resources after transmitting the reporting pre-notification message.

2. The UE of claim 1, wherein the beam reporting includes (i) the RSRP or the SINR and (ii) a RS resource indicator.

3. The UE of claim 1, wherein the reporting pre-notification message includes information indicating the at least one UL reporting resource from the set of UL reporting resources to be used to transmit the beam reporting.

4. The UE of claim 1, wherein the threshold is signaled to the UE via a physical downlink control channel (PDCCH).

5. The UE of claim 1, wherein the reporting pre-notification message comprises an offset value indicating a number of slots between the reporting pre-notification message and the beam reporting.

6. The UE of claim 5, wherein the offset value is signaled to the UE via a physical downlink control channel (PDCCH).

7. A base station (BS) comprising:
a processor configured to:
generate configuration information on a beam reporting and a set of uplink (UL) reporting resources; and
a transceiver operably connected to the processor, the transceiver configured to:
transmit, to a user equipment (UE), the configuration information for the beam reporting and the set of UL reporting resources;
transmit, to the UE, at least one reference signal (RS) resource;
transmit, to the UE, a threshold;
receive, from the UE, a reporting pre-notification message after determination that an event occurs based on a value for at least one of a reference signal received power (RSRP) or a signal to interference-plus-noise ratio (SINR) for the at least one RS resource being smaller than the threshold, the reporting pre-notification message configured to notify the BS that the UE will transmit the beam reporting; and
receive, from the UE, the beam reporting on at least one UL reporting resource from the set of UL reporting resources after receiving the reporting pre-notification message.

8. The BS of claim 7, wherein the beam reporting includes (i) the RSRP or the SINR and (ii) a RS resource indicator.

9. The BS of claim 8, wherein the reporting pre-notification message includes information indicating the at least one UL reporting resource from the set of UL reporting resources to be used to transmit the beam reporting.

10. The BS of claim 7, wherein the transceiver is configured to transmit the threshold to the UE via a physical downlink control channel (PDCCH).

11. The BS of claim 7, wherein the reporting pre-notification message comprises an offset value indicating a number of slots between the reporting pre-notification message and the beam reporting.

12. The BS of claim 11, wherein the offset value is signaled to the UE via a physical downlink control channel (PDCCH).

13. A method for operating a user equipment (UE), the method comprising:
- receiving, from a base station, configuration information on a beam reporting and a set of uplink (UL) reporting resources;
- receiving at least one reference signal (RS) resource;
- measuring the at least one RS resource for calculating the beam reporting;
- determining that an event occurs based on detecting that a value for at least one of a reference signal received power (RSRP) or a signal to interference-plus-noise ratio (SINR) is smaller than a threshold, wherein the threshold is signaled to the UE by the base station;
- calculating the beam reporting in response to determining that the event occurs;
- transmitting a reporting pre-notification message in response to occurrence of the event, the reporting pre-notification message configured to notify the base station that the UE will transmit the beam reporting; and
- transmitting the beam reporting on at least one UL reporting resource from the set of UL reporting resources after transmitting the reporting pre-notification message.

14. The method of claim 13, wherein the beam reporting includes (i) the RSRP or the SINR and (ii) a RS resource indicator.

15. The method of claim 13, wherein the reporting pre-notification message includes information indicating the at least one UL reporting resource from the set of UL reporting resources to be used to transmit the beam reporting.

16. The method of claim 13, wherein the threshold is signaled to the UE via a physical downlink control channel (PDCCH).

17. The method of claim 13, wherein the reporting pre-notification message comprises an offset value indicating a number of slots between the reporting pre-notification message and the beam reporting.

18. The method of claim 17, wherein the offset value is signaled to the UE via a physical downlink control channel (PDCCH).

* * * * *